June 16, 1925.
C. A. HARTUNG
1,542,242
METHOD AND APPARATUS FOR CARRYING OUT AUTOMATIC GAS ANALYSIS BY WEIGHT
Filed Nov. 14, 1924
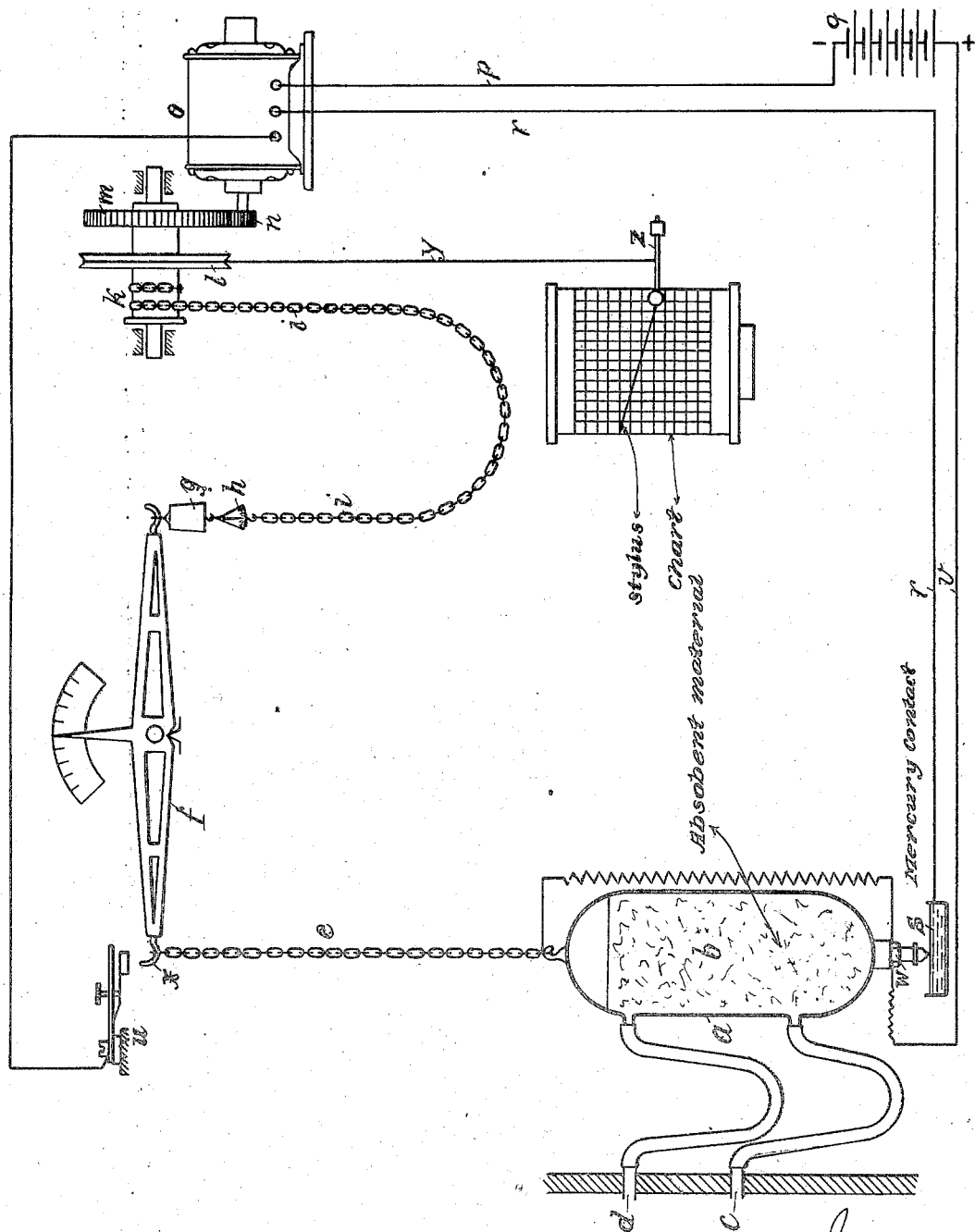
Inventor
Carl A. Hartung
By
B. Singer Atty.

Patented June 16, 1925.

1,542,242

UNITED STATES PATENT OFFICE.

CARL A. HARTUNG, OF BERLIN, GERMANY.

METHOD AND APPARATUS FOR CARRYING OUT AUTOMATIC GAS ANALYSIS BY WEIGHT.

Application filed November 14, 1924. Serial No. 749,964.

*To all whom it may concern:*

Be it known that I, CARL A. HARTUNG, of Berlin, Germany, have invented certain new and useful Improvements in Methods and Apparatus for Carrying Out Automatic Gas Analysis by Weight, of which the following is a specification.

Devices are known for automatically ascertaining or measuring certain components of gas mixtures by weight and to record the values received in a diagram.

For this purpose a stream of the gas mixture to be analyzed is caused to pass through a vessel which is filled with certain absorbent material; the flow of the said stream being maintained as constant as possible by manually or automatically operated means. The permanent absorption of even the smallest gas quantities perceptibly increases the weight of the vessel, and the amount of this increase is weighed by a scale or balance to which the said vessel is attached and of which the amount of displacement can be graphically recorded. The increase in weight calculated to unit time then gives, at a certain ratio of flow, the percentage of the absorbed gas components, which had to be determined.

This invention is an improvement in devices of this class and in the method of carrying out such analysis, and its main object is to provide a device of greater sensitiveness as compared with the known type of apparatus.

Another object of the invention is the provision of an improved sensitive control of the weighing and registering apparatus by means of the increase in the weight of the absorption vessel itself.

Other objects and improvements of the invention will be apparent from the accompanying sheet of drawings in which a device according to my invention is diagrammatically illustrated by way of example.

In this drawing $a$ is a vessel which is filled with absorbent material $b$ for the gas component or components to be determined. The gas mixture enters the vessel through a thin and easily movable piece of rubber tubing or the like $c$ and leaves it through a similar tube $d$. Both these tubes $c$ and $d$ have their other ends fastened into a fixed wall, and since the absorption vessel always remains in approximately the same position, the alteration in weight as produced by the said small rubber tubes need not be taken into account. The absorption vessel $a$ is suspended from the one arm of a two-arm balance $f$ by means of a chain $e$, while the other arm of the said balance carries a compensation weight $g$ and taring scale $h$, as also a chain $i$, of which the other end is attached to a roller $k$. Upon the axis of this roller $k$ and rotatable therewith is provided a small pulley $l$ and a driving gear wheel $m$, which latter engages with the pinion $n$ of a small electric motor $o$. An electric wire $p$ leads from the motor $o$ to a battery $q$, another wire, $r$, to the mercury contact $s$ below the absorption vessel, while a third wire leads to an adjustable contact $u$ above the weighing end of the balance $f$.

A wire $v$ leads from the battery $q$ to a contact pin $w$ externally provided at the bottom of the absorption vessel $a$, and further to the chain $e$ and thus to the metallic suspension hook $x$ of the balance $f$. A cord $y$ is passed over the pulley $l$ and, with its free end, is attached to the stylus $z$ provided to record upon a chart arranged in the usual manner upon a clock-work rotated drum.

The device operates in the following manner:

The gas mixture enters the vessel $a$ at a constant flow through the tube $c$, passes through the material $b$ and eventually leaves the vessel by the tube $d$. Assuming the entire weighing device to be in equilibrium, then the recording stylus $z$ will point to the upper edge of the chart on the recording drum. If now such components of the gas mixture which are capable of absorption by the absorbent material in the vessel $a$ are contained in the gas, they will be retained, and the weight of the vessel increased by that amount. Thereby the equilibrium of the weighing system becomes disturbed and the absorption vessel $a$ moves downward. Hereby the contact pin $w$, which is in connection with the battery, dips into the mercury contained in the small dish $s$, thus closing a circuit over the electric motor $o$ which immediately begins to rotate. Hereby the roller $k$ is also rotated by means of the toothed gear $m$, $n$, so that the chain $i$ unwinds and thus adds weight to the arm of the balance opposite the absorption vessel. In this way the increase in the weight of the absorption vessel is compensated for and the latter raised again. As soon as the vessel reascends, pin w leaves the mercury, the circuit is interrupted and the motor comes to rest. However, in case too large a portion of the chain i should have unwound, or if the balance should have been disturbed in some other way, the hook x of the balance beam engages the contact u, thus closing the motor circuit over the wires t and p, causing the motor to rotate in the opposite direction, and rewind the chain i to the required amount. The pulley l as also the cord y and the stylus z are naturally caused to join the movement of the roller k.

The electric drive just described may, of course, be replaced by any other driving means as long as the main feature of the invention is maintained, namely, the control of the weighing operation directly or indirectly by the movement of the balance or its connected parts.

What I claim is:—

1. A method for carrying out automatic gas analysis by weight, which consists in passing the gas through absorbent material, continuously balancing said material, controlling the balancing operation by the increase in weight of the material, and recording the increase in weight.

2. A method for carrying out automatic gas analysis by weight, which consists in passing a gas mixture through absorbent material, retaining certain components of the mixture within said absorbing material, continuously balancing said material, controlling the balancing operation by the increase in weight of the material, and recording the increase in weight.

3. A device for carrying out the herein-described method of automatic gas analysis by weight, comprising in combination a vessel containing absorbent material, flexible gas conduits leading to and from said vessel, a weighing device for the vessel, a counterweight on said weighing device acting upon rotary means, means to increase the magnitude of the counterweight corresponding to the increase in the weight of the absorbent material, and means to record the increase in weight.

4. A device for carrying out the herein-described method of automatic gas analysis by weight, comprising in combination a vessel containing absorbent material, flexible gas conduits leading to and from said vessel, a weighing balance from which the vessel is suspended, a flexible member to serve as counterweight and suspended from the weighing balance, a roller on which the free end of the flexible member is wound up, a pulley co-axial with said roller and a gear wheel also co-axial with said roller, an electric driving device having a pinion in engagement with the said gear wheel on the roller axis, electric contacts to close circuits through the motor when the weighing absorbing vessel descends and ascends, a stylus writing on a chart, and a cord passed over the pulley and attached to the stylus.

5. A device for carrying out the herein-described method of automatic gas analysis by weight, comprising in combination a vessel containing absorbent material, flexible gas conduits leading to and from said vessel, a weighing device for continuously balancing the vessel, means to reset the weighing device operated by the increase in the weight of the said vessel, and means to record the increase in weight.

In witness whereof I affix my signature.

CARL A. HARTUNG.